United States Patent
Okpisz et al.

(10) Patent No.: US 6,324,622 B1
(45) Date of Patent: Nov. 27, 2001

(54) 6XX BUS WITH EXCLUSIVE INTERVENTION

(75) Inventors: Alexander Edward Okpisz; Thomas Albert Petersen, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/138,320

(22) Filed: Aug. 24, 1998

(51) Int. Cl.[7] .................................................. G06F 12/00
(52) U.S. Cl. ..................... 711/146; 711/141; 711/144; 711/147
(58) Field of Search ................................. 711/146, 141, 711/144, 147, 154

(56) References Cited

U.S. PATENT DOCUMENTS

| | | | |
|---|---|---|---|
| 5,367,695 | 11/1994 | Narad et al. ........................ | 395/800 |
| 5,467,295 | 11/1995 | Young et al. ................... | 395/200.05 |
| 5,469,435 | 11/1995 | Krein et al. ........................ | 370/85.2 |
| 5,548,732 | 8/1996 | Hoashi et al. ....................... | 395/285 |
| 5,553,247 | 9/1996 | Lallement ............................ | 395/293 |
| 5,555,425 | 9/1996 | Zeller et al. ........................ | 395/800 |
| 5,604,874 | 2/1997 | Kondo et al. ....................... | 395/298 |
| 5,621,897 | 4/1997 | Boury et al. ........................ | 395/296 |
| 5,680,576 | * 10/1997 | Laudon ............................. | 395/472 |
| 5,963,974 | * 10/1999 | Arimilli et al. ..................... | 711/130 |
| 6,018,791 | * 1/2000 | Arimilli et al. ..................... | 711/141 |
| 6,055,608 | * 4/2000 | Arimilli et al. ..................... | 711/146 |

* cited by examiner

Primary Examiner—Do Hyun Yoo
Assistant Examiner—Kimberly McLean
(74) Attorney, Agent, or Firm—Anthony V. S. England; Robert M. Carwell; Bracewell & Patterson, L.L.P.

(57) ABSTRACT

Data loaded from system memory to a cache within a multiprocessor system is set to the exclusive coherency state if no other cache or processor has a copy of that data. Subsequent accesses to the data by another processor or cache which are snooped by the data owner result in an exclusive intervention by the data owner. The data owner sources the data to and shares the data with the requesting device on a read and transfers exclusive ownership of the data to the requesting device on a read with intent to modify. Unmodified intervention with cache-to-cache transfers over possibly much slower accesses to memory is thus supported by the multiprocessor system without requiring additional tag or status bits in the cache directories, saving a significant area.

4 Claims, 4 Drawing Sheets

| Internal Operation | Current Master MESI | Current Slave MESI | Bus Operation | Bus Response | New Master MESI | New Slave MESI | Owner | Comment |
|---|---|---|---|---|---|---|---|---|
| load, dcbt, ifetch, lmw, lsw (I=0) | Invalid | Exclusive | READ (burst) | Exclusive Intervention | Shared | Shared | Memory | The slave owns the data so it sources the data. After the transaction completes, memory owns the data while the master and slave just have shared copies. |
| store, dcbst, stmw, stsw (W=0) and (I=0) | Invalid | Exclusive | RWITM | Exclusive Intervention | Exclusive | Invalid | Master | The slave owns the data so it sources the data. Ownership is passed from the slave to the master. |

Fig. 2A

| Internal Operation | Current Master MESI | Current Slave MESI | Bus Operation | Bus Response | New Master MESI | New Slave MESI | Owner | Comment |
|---|---|---|---|---|---|---|---|---|
| load, dcbt, ifetch, lmw, lsw (I=0) | Invalid | Exclusive | READ (burst) | Shared | Shared | Shared | Memory | Memory owns the data so it sources the data while the slave changes state from exclusive to shared. |
| store, dcbst, stmw, stsw (W=0) and (I=0) | Invalid | Exclusive | RWITM | Shared | Exclusive | Invalid | Master | Memory owns the data so it sources the data while the slave changes state from exclusive to shared. The master now has the data exclusive. |

Fig. 2B

| Internal Operation | Current Master MESI | Current Slave MESI | Bus Operation | Bus Response | New Master MESI | New Slave MESI | Owner | Comment |
|---|---|---|---|---|---|---|---|---|
| load, dcbt, ifetch, lmw, lsw (I=0) | Invalid | Shared Owner | READ (burst) | Shared Intervention | Shared Owner | Shared | Master | Ownership is passed from the slave to the master. |
| store, dcbst, stsw, stmw (W=0) and (I=0) | Invalid | Shared Owner | RWITM | Shared Intervention | Exclusive | Invalid | Master | Ownership is passed from the slave to the master. |

Fig. 4 Prior Art

6XX BUS WITH EXCLUSIVE INTERVENTION

BACKGROUND OF THE INVENTION

1. Technical Field

The present invention relates in general to data transfers in multiprocessor systems and in particular to intervention mechanisms in multiprocessor systems. Still more particularly, the present invention relates to providing a mechanism for transferring exclusive data between processors without the extra ownership directory bit required for shared intervention.

2. Description of the Related Art

Contemporary data processing systems employ multiple processors, multilevel cache hierarchies, or both to improve performance. A conventional symmetric multiprocessor (SMP) system employs several processing elements, which may include a processor and one or more levels of cache memory, connected via a common system bus which also couples the processing elements to any additional cache memories and to system memory. In such SMP systems, each processing element is capable of acting as a system bus master, initiating bus operations affecting the storage hierarchy. Cache controllers for additional caches in the storage hierarchy are also capable of acting as the system bus master, and of snooping bus operations initiated by other devices connected to the system bus. Devices may also intervene in snooped bus operations in order to maintain a coherent memory hierarchy.

Multiprocessor data processing systems frequently employ the concept of logical "ownership" of data to which all processors share access in order to preserve coherency (data integrity), a concept which forms the basis for intervention. Devices such as processors and cache controllers may intervene in snooped bus operations in order to preserve data integrity within the storage hierarchy. For example, where one device initiates a read or read with intent to modify (rwitm) request for specified data which is resident within a second device in the modified state, the second device intervenes in the bus operation for the purpose of sourcing the modified data to the requesting device (a "modified intervention"). Similarly, where data requested by a read or rwitm bus operation is resident within a device in the shared state, the device intervenes with the requested data (a "shared intervention").

Shared intervention is employed in multiprocessor systems to improve latency, since horizontal cache devices may frequently source requested data much faster than system memory. The cache coherency state transitions associated with a shared intervention are tabulated in FIG. 4. A device seeking to load a shared cache line owned by a horizontal device will receive a shared intervention from the horizontal device, which will then source the data to the requesting device. Similarly, a device seeking to store to a shared cache line owned by a horizontal device will also receive a shared intervention from the horizontal device, although no data need be sourced to the requesting device. In both cases, "ownership" of the cache line passes from the horizontal device to the requesting device.

Shared intervention allows a processor or an in-line cache to own a shared cache line, as opposed to the conventional ownership by memory of all shared cache lines. However, the owner of the shared cache line must be marked, and ownership is generally recorded in an extra tag or status bit within the cache directories. The extra bit is set when ownership of the shared cache line is received, and a device with this ownership bit set will respond to future requests for the cache line with a shared intervention. Shared intervention allows fast cache-to-cache transfers to supplant possibly much slower accesses to memory.

It would be desirable, therefore, to provide a mechanism for unmodified intervention without the additional requirements of an extra directory tag or status bit.

SUMMARY OF THE INVENTION

It is therefore one object of the present invention to provide an improved method and mechanism for data transfers in multiprocessor systems.

It is another object of the present invention to provide an improved method and mechanism for intervention in data transfers in multiprocessor systems.

It is yet another object of the present invention to provide a mechanism and method for transferring exclusive data between processors without the extra ownership directory bit required for shared intervention.

The foregoing objects are achieved as is now described. Data loaded from system memory to a cache within a multiprocessor system is set to the exclusive coherency state if no other cache or processor has a copy of that data. Subsequent accesses to the data by another processor or cache which are snooped by the data owner result in an exclusive intervention by the data owner. The data owner sources the data to—and shares the data with—the requesting device on a read and transfers exclusive ownership of the data to the requesting device on a read with intent to modify. Unmodified intervention with cache-to-cache transfers over possibly much slower accesses to memory is thus supported by the multiprocessor system without requiring additional tag or status bits in the cache directories, saving a significant area.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A–2B are tables containing coherency states and bus operations with exclusive intervention in accordance with a preferred embodiment of the present invention;

FIG. 4 is a table of cache coherency state transitions and bus operations associated with a shared intervention in accordance with the known art.

DETAILED DESCRIPTION OF THE PREFERRED EMBODIMENT

Figure 1:
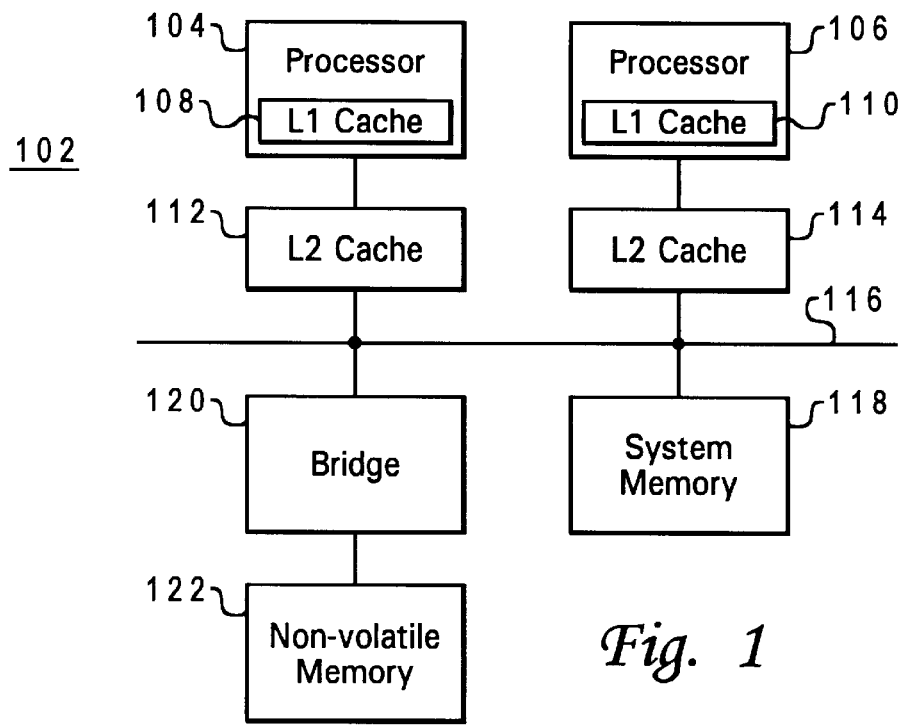
FIG. 1 depicts a block diagram of a multiprocessor system in which a preferred embodiment of the present invention may be implemented.

With reference now to the figures, and in particular with reference to FIG. 1, a block diagram of a multiprocessor system in which a preferred embodiment of the present invention may be implemented is depicted. Multiprocessing system 102 includes processors 104 and 106, which preferably conform to the specifications of the Power™ family of processors. Each processor 104 and 106 includes an on-chip L1 cache 108 and 110, respectively, and in-line L2 caches 112 and 114, respectively. L2 caches 112 and 114 connect the respective processors 102 and 104 to system bus 116.

Also connected to system bus 116 in the exemplary embodiment is system memory 118 and bridge 120 coupling nonvolatile storage 122 to system bus 116. Those skilled in the art will recognize that multiprocessor system 102 may also include other components not shown such as a keyboard, mouse or other input devices, a display, a network interface card, etc. Such variations are within the spirit and scope of the present invention.

Multiprocessor system 102 in the exemplary embodiment includes a coherency protocol such as the MESI protocol or a variant. The modified (M) coherency state indicates that only one cache has the valid copy of the data, and that copy is "dirty" or modified with respect to the copy in system memory. The exclusive (E) coherency state is defined to signify that only one cache has a valid copy of the data, which is unmodified with respect to the data in system memory. The shared (S) coherency state denotes that one or more caches have copies of the data and that no copy is modified with respect to system memory. The invalid (I) coherency state in a cache indicates that cache does not have a valid copy of the data. Additional coherency states may also be implemented. Multiprocessor system 102 also includes the logic for an exclusive intervention as described in further detail below.

Referring now to FIGS. 2A–2B, tables containing coherency states and bus operations with exclusive intervention in accordance with a preferred embodiment of the present invention, and without exclusive intervention, are shown. FIG. 2A illustrates the coherency state transitions and bus operations associated with the exclusive intervention of the present invention. Data loaded from system memory into a cache (including a processor's L1 cache) is set to the exclusive coherency state if no other device in the storage hierarchy other than system memory currently has a copy of that data. The device loading the data in the exclusive state is referred to as an "exclusive owner" of the data.

For any subsequent instruction resulting in a read bus operation—including load, dcbt, ifetch, lmw, and lsw—a horizontal device snooping the read bus operation which has exclusive ownership of the requested data will assert an exclusive intervention. This is a bus response to the read operation which identifies the exclusive owner of the requested data. The data is then sourced to the requesting device by the exclusive owner, which shares copies of the data with the requesting device. Both the (former) exclusive owner and the requesting device transition to the shared coherency state after the transaction completes, and memory owns the data in accordance with the known art.

For any subsequent instruction which results in a rwitm bus operation—including store, dcbst, stmw, and stsw—the exclusive owner again asserts an exclusive intervention bus response to the rwitm bus operation. The data may be sourced from the exclusive owner to the requesting device, although the requesting device may simply discard the sourced data. After the transaction completes, the requesting device transitions to the exclusive coherency state, becoming the new exclusive owner of the requested data, and the former exclusive owner transitions to the invalid coherency state. Ownership of the data is thus effectively transferred from one cache to another.

FIG. 2B illustrates the bus operations and coherency transitions without exclusive intervention. As may be seen, the coherency state transitions are identical, but the bus response and the source of the data sought to be accessed differs. Without exclusive intervention, a device with data in the exclusive coherency state simply transitions to the shared coherency state and permits memory to source the requested data, throughout which ownership of the data always resides in memory. In contrast, within the present invention ownership transfers to higher-level devices in the storage hierarchy loading the data from memory in an exclusive coherency state, and reverts to memory only when the coherency state in the upper storage hierarchy levels transitions to the shared state.

Figure 3:
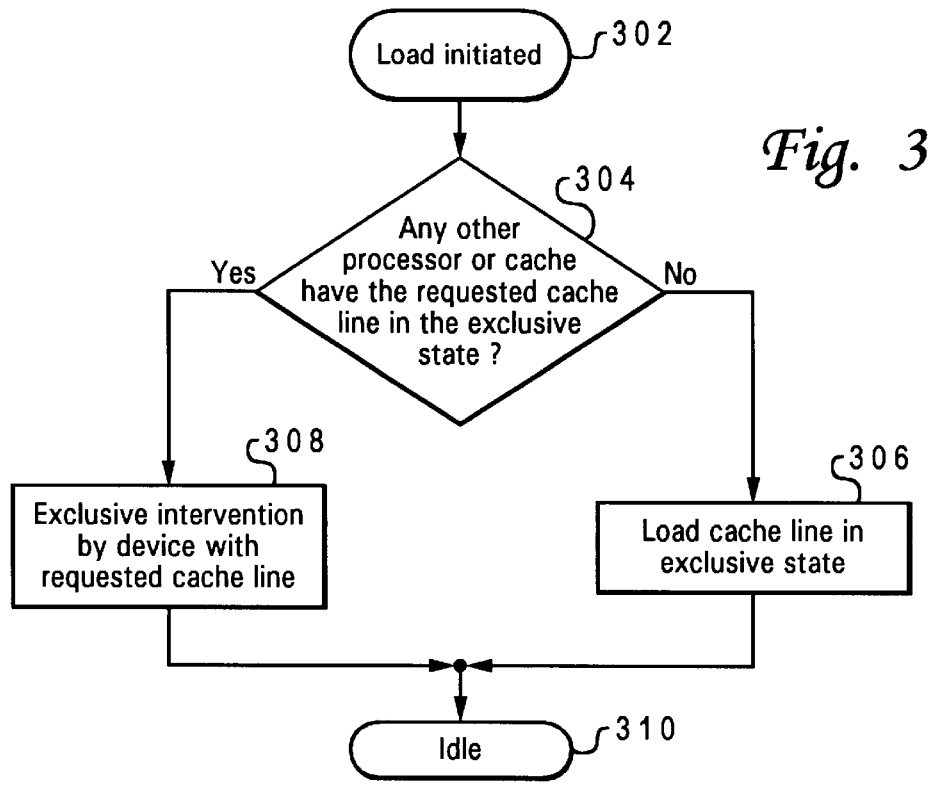
FIG. 3 depicts a high level flowchart for a process of accessing data within a storage hierarchy implementing exclusive intervention in accordance with a preferred embodiment of the present invention.

With reference now to FIG. 3, a high level flowchart for a process of accessing data within a storage hierarchy implementing exclusive intervention in accordance with a preferred embodiment of the present invention is depicted. The process is implemented within upper level devices, cache controllers and processors, in a multiprocessor system.

The process begins at step 302, which depicts an attempted access of data snooped on the system bus. The process then passes to step 304, which illustrates a determination of whether any other processor or cache in the storage hierarchy currently has a copy of the requested data. If not, the process proceeds to step 306, which depicts loading the requested data from memory to the requesting device in the exclusive coherency state, transferring ownership of the data from memory to the requesting device.

If a horizontal processor or cache snooping the bus operation seeking access to the data currently owns the data (has a copy in the exclusive or unmodified state), the process proceeds instead to step 308, which illustrates an exclusive intervention by the data owner, which sources the requested data to the requesting device. As noted above, if the access was a simple read operation, the (former) data owner and the requesting device both transition to the shared coherency state after the transfer and ownership of the data reverts to memory. If the access was a rwitm operation, however, ownership of the data transfers with the requested data. The process then passes to step 310, which depicts the process becoming idle until another data access is detected.

The present invention permits intervention by a cache having data in other than the modified, invalid, or shared coherency state (that is, permits intervention by a cache having data in the exclusive state). The faster cache-to-cache transfer times may thus be exploited beneficially over the slower accesses to memory. Unlike shared intervention, ownership may be assumed from the exclusive coherency state and ownership bits within the tag or status portions of the cache directory are not required, reducing the size of the array.

While the invention has been particularly shown and described with reference to a preferred embodiment, it will be understood by those skilled in the art that various changes in form and detail may be made therein without departing from the spirit and scope of the invention.

What is claimed is:

1. A method of improving data access latency, comprising:

initiating a bus operation from a first device requesting access to data within a system memory in order to copy that data;

responsive to detecting the bus operation in a second device owning the data, intervening in the bus operation with a bus response indicating that the second device has exclusive ownership of the data and that no other device, except for system memory, has a valid copy of the data;

transferring the data from the second device to the first device and, upon completion of the transfer;

transitioning to an invalid coherency state with respect to the transferred data in the second device; and transitioning to the exclusive coherency state with respect to the transferred data in the first device, wherein ownership of the data passes from the second device to the first device.

2. The method of claim 1, wherein the step of intervening in the bus operation further comprises:

asserting an exclusive intervention bus response to the bus operation.

3. A mechanism for improving data access latency, comprising:

a multiprocessor system including a system bus;

a first device within the multiprocessor system initiating a bus operation on the system bus requesting access to data within a system memory connected to the system bus in order to copy that data; and a second device within the multiprocessor system owning the data and snooping the system bus, and, responsive to detecting the bus operation, intervening in the bus operation with a bus response indicating that the second device has exclusive ownership of the data and that no other device, except for system memory, has a valid copy of the data; and transferring the data to the first device and, upon completion of the transfer, transitions to an invalid coherency state with respect to the transferred data while the first device transitions to the exclusive coherency state with respect to the transferred data, wherein ownership of the data passes from the second device to the first device.

4. The mechanism of claim 3, wherein the second device asserts an exclusive intervention bus response to the bus operation.

* * * * *

UNITED STATES PATENT AND TRADEMARK OFFICE
CERTIFICATE OF CORRECTION

PATENT NO. : 6,324,622 B1 Page 1 of 1
DATED : November 27, 2001
INVENTOR(S) : Okpisz et al.

It is certified that error appears in the above-identified patent and that said Letters Patent is hereby corrected as shown below:

Column 2,
Line 4, please add -- This provides a sizable benefit, but at the cost of significant additional hardware. A 1 MB, eight way set associative, 128 byte cache line 32 byte sector cache increases in size by 12.5 percent (4KB) with the addition of a single extra directory bit. -- after the word "memory.".

Signed and Sealed this

Tenth Day of September, 2002

Attest:

Attesting Officer

JAMES E. ROGAN
Director of the United States Patent and Trademark Office